(12) United States Patent
Hukkanen

(10) Patent No.: US 9,235,054 B2
(45) Date of Patent: Jan. 12, 2016

(54) OPTICAL SURFACE, LENS AND REFLECTOR

(71) Applicant: Ledil Oy, Salo (FI)

(72) Inventor: Hannu Hukkanen, Salo (FI)

(73) Assignee: Ledil Oy, Salo (FI)

( * ) Notice: Subject to any disclaimer, the term of this patent is extended or adjusted under 35 U.S.C. 154(b) by 119 days.

(21) Appl. No.: 13/792,312

(22) Filed: Mar. 11, 2013

(65) Prior Publication Data

US 2014/0160575 A1    Jun. 12, 2014

(30) Foreign Application Priority Data

Dec. 12, 2012 (FI) .................................... 20126298

(51) Int. Cl.
  *G02B 27/10* (2006.01)
(52) U.S. Cl.
  CPC .................... *G02B 27/1006* (2013.01)
(58) Field of Classification Search
  CPC .................................................. G02B 19/0028
  USPC ......................................................... 359/627
  See application file for complete search history.

(56) References Cited

U.S. PATENT DOCUMENTS

| | | | |
|---|---|---|---|
| 4,531,812 A * | 7/1985 | Oguino | ........................ 359/457 |
| 6,746,129 B2 | 6/2004 | Ohkawa | |
| 7,431,492 B2 | 10/2008 | Ohkawa | |
| 7,445,370 B2 | 11/2008 | Ohkawa | |
| 7,607,799 B2 | 10/2009 | Ohkawa | |
| 2011/0018016 A1 | 1/2011 | Bierhuizen et al. | |

* cited by examiner

*Primary Examiner* — James Jones
(74) *Attorney, Agent, or Firm* — Seppo Laine Oy

(57) ABSTRACT

The present invention provides an optical surface which is able to mix different wavelengths into a light pattern which contains all wavelengths evenly distributed across the pattern. The novel optical surface extends in at least two Cartesian base dimensions (X, Y), whereby a cross-section of the surface taken in either of said two Cartesian base dimensions (X, Y) features a first plurality of protuberances which extend to the same direction in a third Cartesian dimension (Z). The cross-section of the optical surface also features a second plurality of protuberances which extend to the opposite direction as the first plurality of protuberances in the third Cartesian dimension (Z). The pluralities of protuberances form converging and diverging optical shapes for mixing different wavelengths scattering from the optical surface.

9 Claims, 9 Drawing Sheets

OPTICAL SURFACE, LENS AND REFLECTOR

FIELD

The present invention relates to illumination. In particular, the invention relates to devices for producing a light pattern with an even color distribution. More specifically, the invention relates to an optical surface according to the preamble portion of claim 1.

BACKGROUND

Light emitting diodes, i.e. LED's, have become an increasingly popular source of light for illuminators. The recent developments in LED technology have radically improved the output of the diodes, whereby new application areas have emerged. Indeed, the use of LED's has expanded from the traditional indication purposes to more demanding indoor and outdoor lighting apparatuses.

The improved light output has revealed problems newly associated with LED's. One particular issue is the color distribution in the produced light patter. Color distribution was never considered an issue with traditional LED's because they had relatively low light output. With modern LED's with high light output, however, the distribution of color is a concern as LED's are used to illuminate large areas in indoor lighting, for example. The issue is emphasized when using separate LED's for particular wavelength bandwidths. In indoor lighting applications, for example, it is common to use one LED for each primary color, i.e. three LED's for red, green and blue, respectively. In such a multi-source illuminator it is common that the colors are clearly distinguishable in the light pattern produced, which is not desirable when pursuing light with uniform color.

For managing the color distribution, various solutions have been proposed. An established solution for managing the color distribution of illuminators with an LED light source is to use a plurality special lenses, the incident surfaces of which have been treated such to mix different wavelengths produced by the LED into a light pattern which contains all wavelengths evenly distributed across the pattern.

Another solution is proposed by US 2011/0018016 A1 which discloses an optical surface for producing a desired color pattern. The optical surface according to US 2011/0018016 A1 features a plurality of bulges which extend from an otherwise planar emission surface of a lens. The bulges are used to converge light beams refracting from the emission surface of the lens for controlling the color pattern produced.

The optical surface as proposed by US 2011/0018016 A1 is mainly suitable for controlling the angular color distribution pattern, which does not address the issue of mixing different wavelengths produced by the LED into a light pattern which contains all wavelengths evenly distributed across the pattern.

It is therefore an aim of the present invention to provide an optical surface which when used as an emission surface or as a portion thereof—is able to mix different wavelengths produced into a light pattern which contains all wavelengths evenly distributed across the pattern.

SUMMARY

The aim of the present invention is achieved with aid of a novel optical surface which extends in at least two Cartesian base dimensions. A cross-section of the surface taken in either of said two Cartesian base dimensions features a first plurality of protuberances which extend to the same direction in a third Cartesian dimension. The cross-section of the optical surface also features a second plurality of protuberances which extend to the opposite direction as the first plurality of protuberances in the third Cartesian dimension. The pluralities of protuberances form converging and diverging optical shapes for mixing different wavelengths scattering from the optical surface.

More specifically, the optical surface according to the present invention is characterized by the characterizing portion of claim 1.

The aim of the invention is on the other hand achieved with a novel a lens which has such an optical surface, preferably as the emission surface.

Considerable benefits are gained with aid of the present invention. Because the optical surface is provided with both converging and diverging deviations from a planar shape, the light beams exhibiting a certain wavelength are effectively mixed thus producing a light pattern which contains all wavelengths evenly distributed across the pattern. By equipping a lens or a reflector with such a novel optical surface, different colors resulting from defects in a single light source or emitted by a plurality of light sources emitting different wavelengths are effectively mixed thus producing a solid light pattern.

BRIEF DESCRIPTION OF DRAWINGS

In the following, exemplary embodiments of the invention are described in greater detail with reference to the accompanying drawings in which.

DETAILED DESCRIPTION OF EXEMPLARY EMBODIMENTS

Figure 1:
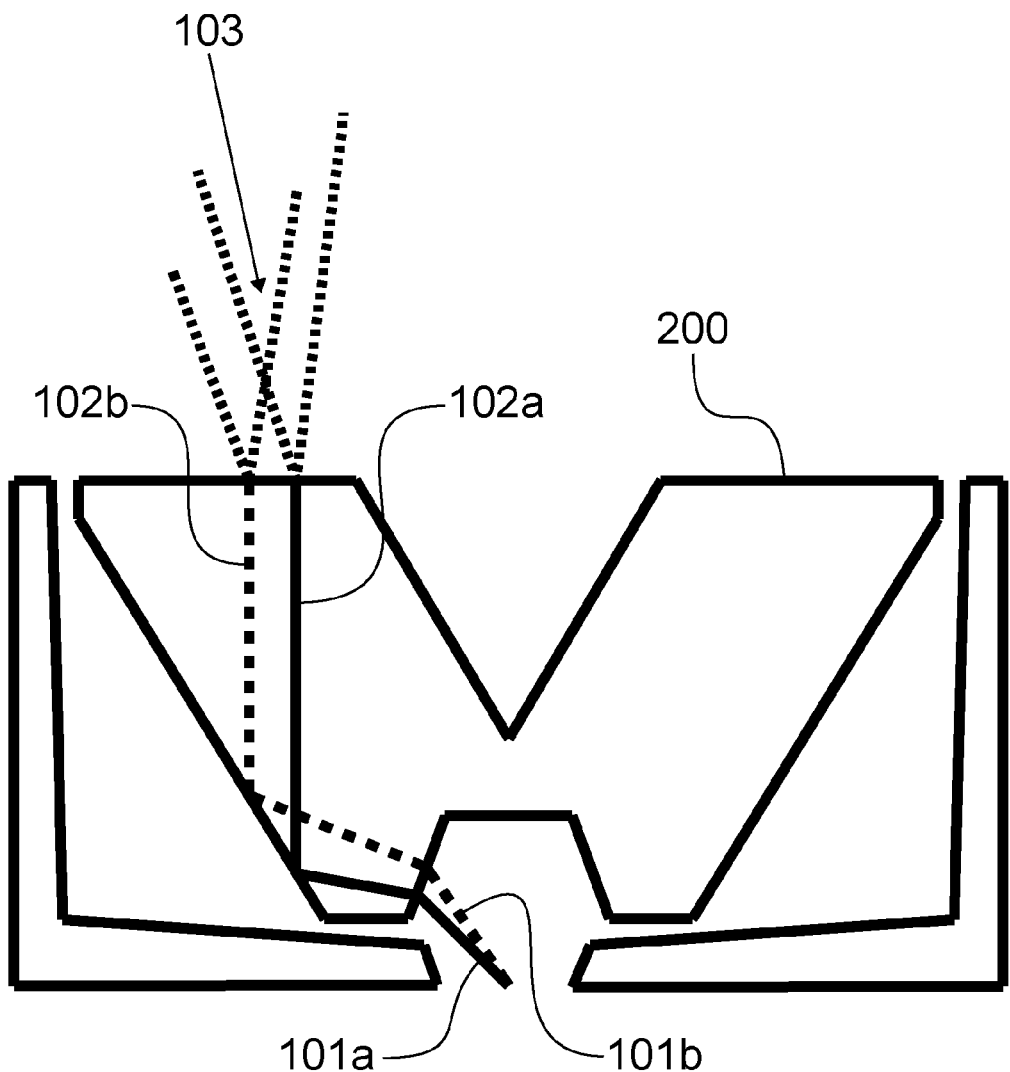
FIG. 1 presents a cross-sectional view of an illuminator featuring a lens which has been provided with an optical surface according to embodiments of the present invention.

The optical surface 200 herein described may be used to scatter light beams transiting from a lens or a reflector. In this context optical surface is meant to refer to a surface which reflects or refracts light beams without substantial absorption of said beams. In this context the term transit is meant to refer to such interference in the path of radiation which causes the radiation to reflect or refract. FIG. 1 demonstrates an example in which light beams 101a, 101b produced by an artificial light source, such as an LED (not shown) travel through an incidence surface of a lens and thus experience a first refraction. The reflected light beams 102a, 102b then exit the lens through an emission surface which has been provided with a novel optical surface 200 for producing scattered light beams 103 with mixed wavelengths. Considering the lens example shown in FIG. 1 and the following elucidation about the particulars of the optical surface, one may conceive a respective reflector application for such an optical surface.

Figure 2:
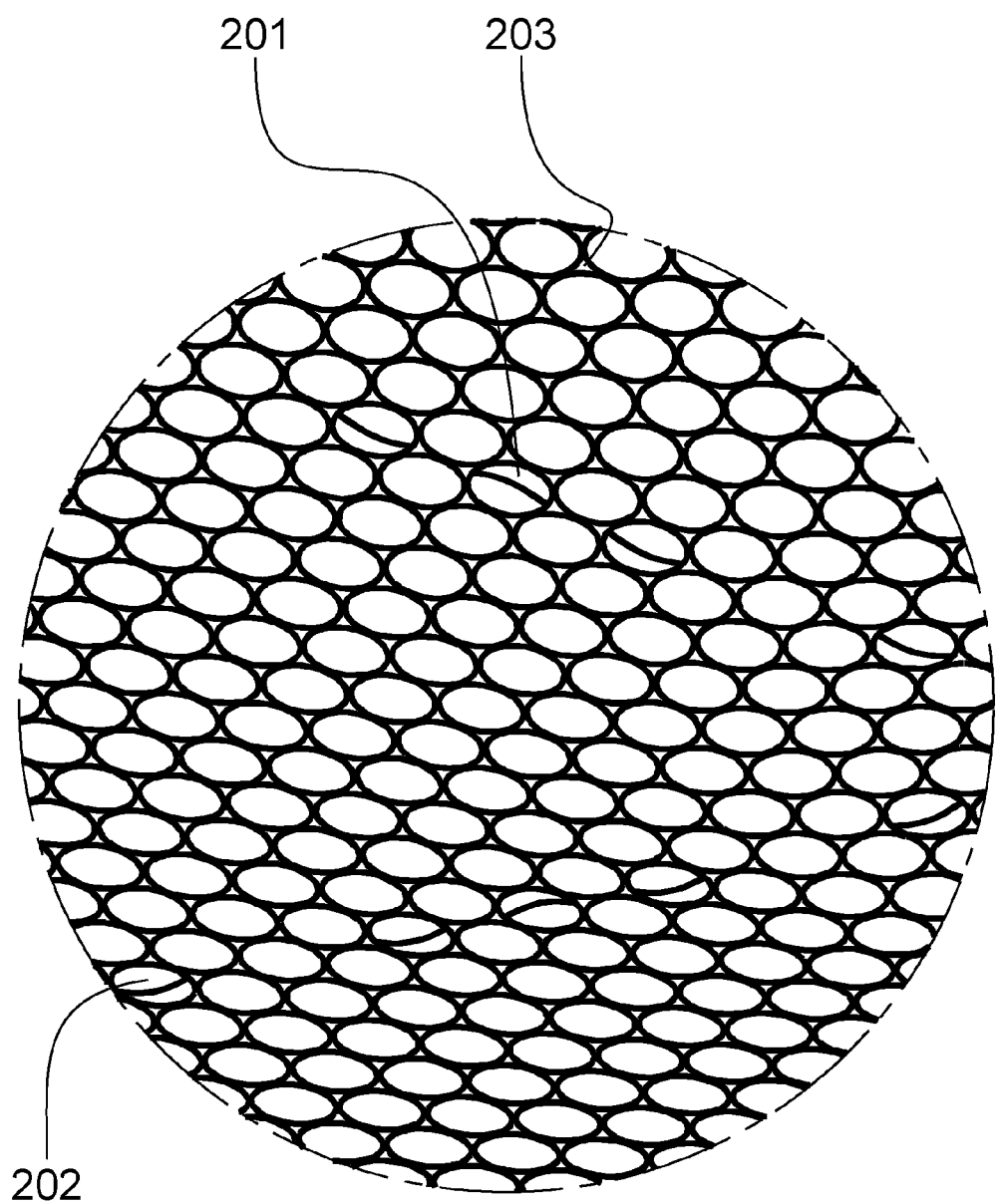
FIG. 2 presents a detailed top elevation view of an optical surface according to one embodiment of the invention featuring alternating converging and diverging protuberances.

FIG. 2 shows a top detail view of the optical surface 200 which features alternating converging and diverging protuberances 201, 202. The converging protuberances 201 project from the base surface 203 toward the main radiation direction and are indicated by a downward opening curve. The diverging protuberances 202 are project from the base surface 203 in a direction opposing the main radiation direction and are indicated by an upward opening curve. As is further apparent from FIG. 2, the protuberances 201, 202 alternate without overlapping each other and without forming groups of neighboring protuberances of the same orientation, whereby each protuberance 201, 202 is at least partly separated by a section of the base surface 203. The separation of each protuberance by a patch of base surface is more visible from FIG. 3. The protuberances 201, 202 have a circular or oval shape when examined from an elevated plan view.

Figure 3:
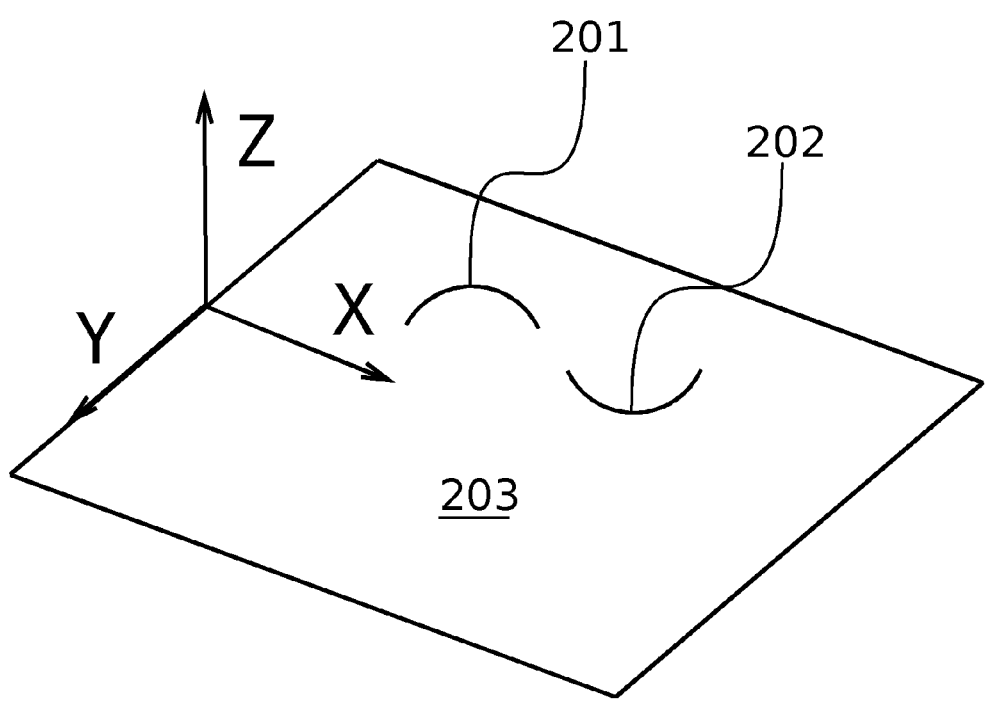
FIG. 3 presents a schematic isometric view of the arrangement of converging and diverging protuberances according to the embodiment of FIG. 2 in a mathematical plane.

The concept of base surface 203 is specified by FIG. 3 which shows a schematic isometric view of the arrangement of converging and diverging protuberances of FIG. 2. The base surface 203 may be seen as a mathematical plane formed by two Cartesian axes which form the base dimension X, Y of the base surface 203. Because the base surface 203 has been provided with the deviations discussed here after, the resulting surface is not planar. Nevertheless, in order to be able to describe the reference from which the protuberances are deviating, the term base surface 203 is used as the starting point for said deviations.

That said, the base surface 203 may also be curved (not shown), whereby the resulting optical surface is both curved and provided with protuberances in mutually opposing directions. In this respect, the base surface 203 may be defined as mainly extending in the two main base Cartesian dimensions X, Y while extending to the third Cartesian dimension Z. By mainly extending is meant that the extent to which the base surface 203 extends in the third Cartesian dimension Z is substantially smaller than the two main base Cartesian dimensions X, Y. More specifically, the extension of the base surface 203 in the third Cartesian dimension Z in a given portion of the surface is at most half of that of either extension in the two main base dimensions X, Y. Where the base surface 203 is provided with an equal amount of opposing protuberances 201, 202 having an equal extension, the base surface 203 may be defined as the continuous surface which would result if the opposing protuberances 201, 202 would cancel each other out. More specifically, if each protuberance shape extending in one direction would be reverted by a corresponding protuberance extending in the opposing direction, the resulting shape would represent the base surface 203.

Figure 9:
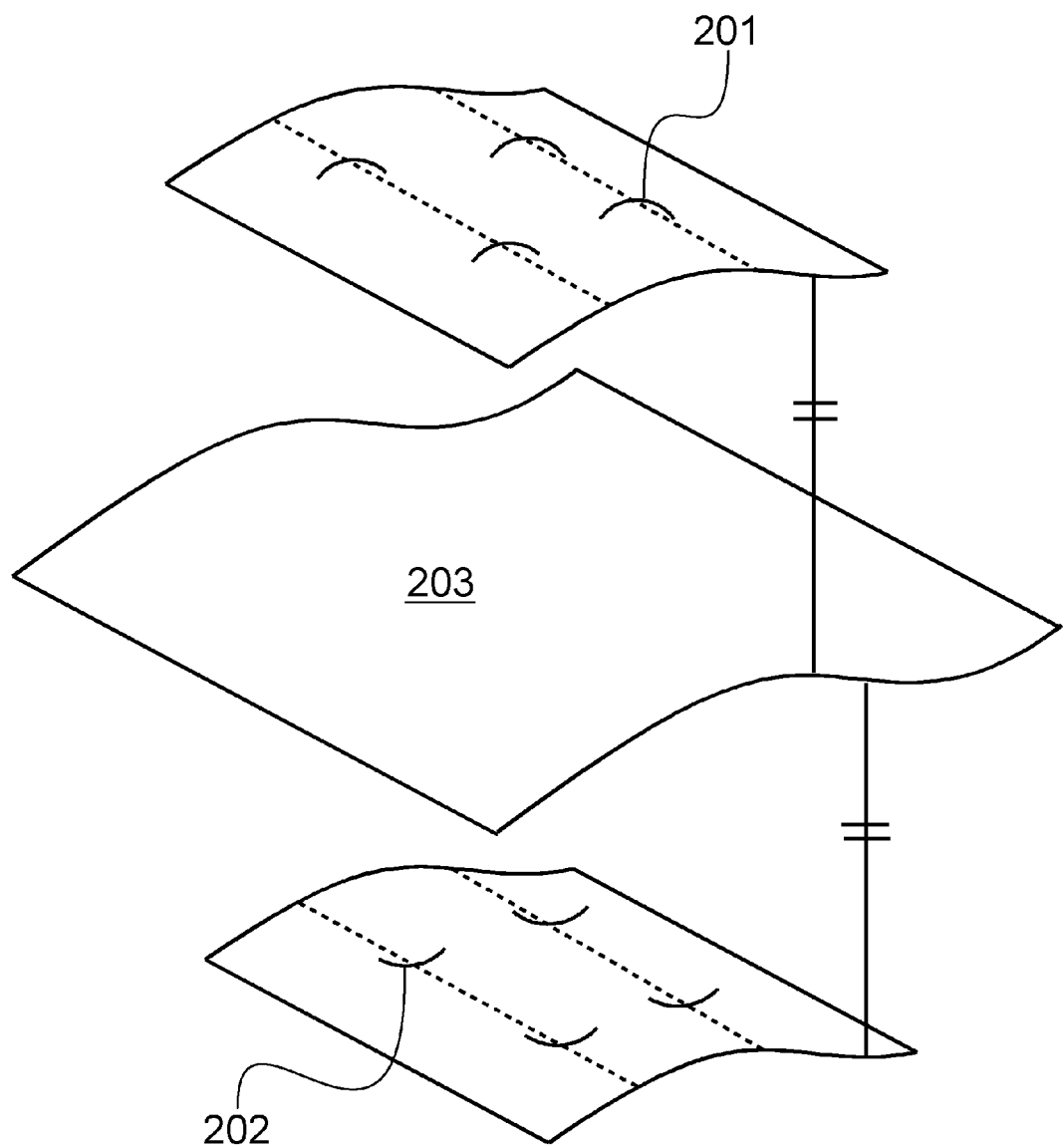
FIG. 9 presents a schematic view of the formation of the base plane according to one approach.

Alternatively, the base surface 203 is defined by a surface continuously connecting the center points of the radii of the protuberances 201, 202, which is demonstrated by FIG. 9. The protuberances 201, 202 are defined by a radius or radii which has/have a center point. In FIG. 9 said center points are connected by a dashed line. When the dashed connecting lines connected, the resulting surface represents the base surface 203 of the optical surface.

Figure 4A:
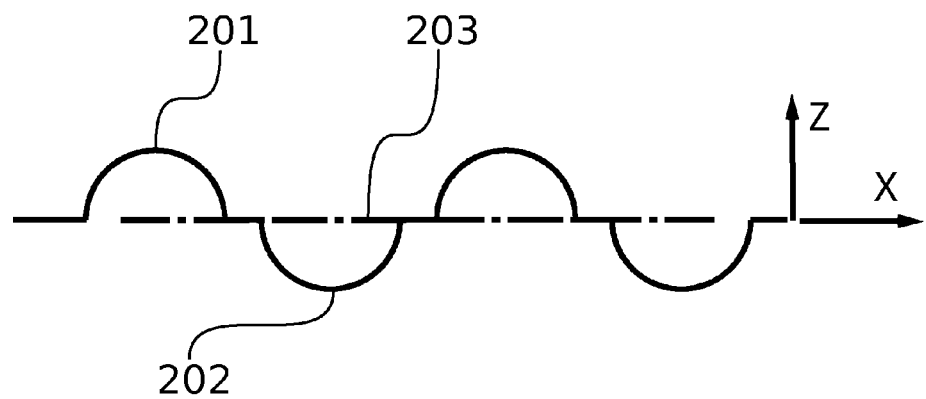
FIG. 4a presents a schematic cross-sectional view of the arrangement of converging and diverging protuberances according to the embodiment of FIG. 2 in a mathematical plane.
Figure 4B:
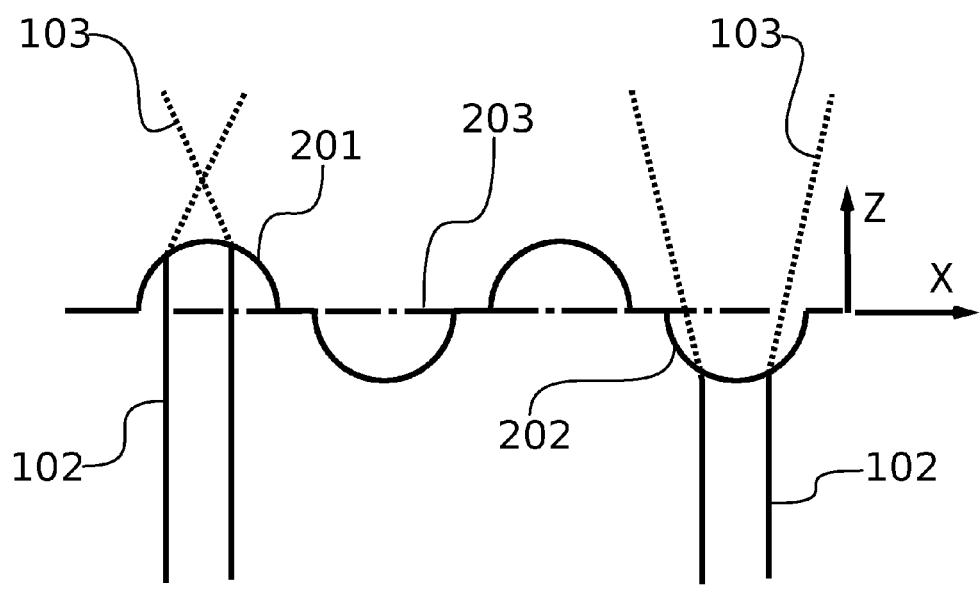
FIG. 4b presents the path of light beams travelling through the arrangement of FIG. 4a, FIG. 5 presents a top elevation view of an optical surface according to a second embodiment of the invention featuring converging and diverging protuberances as shown in FIGS. 3 and 4 arranged as alternating groups of three.

The optical surface depicted in FIGS. 2 and 3 is further clarified by FIGS. 4a and 4b which show a schematic cross-sectional view of the optical surface 200. More specifically, the cross-section of FIGS. 4a and 4b is taken along the second base direction Y of FIG. 3. From the Figures it may be seen that the arrangement of converging and diverging protuberances projecting in opposite directions from the base surface 203. In the illustrated example the base surface 203 is planar. As described above, the base surface 203 may alternatively be curved (not shown). Projecting from the base surface 203 of FIG. 4a, namely from the first base dimension X, is a first plurality of protuberances 201 which extend to one direction in the third Cartesian dimension Z, which direction is upward in FIG. 4. While the first plurality of protuberances 201 are shown to occupy the base surface 203 in the first base direction X, the first plurality of protuberances 201 also occupy the base surface 203 in the second base direction Y as illustrated by FIG. 2. The same applies to the second plurality of protuberances 202 which extend to the opposing direction in the third Cartesian dimension Z, which direction is downward in FIG. 4a. FIG. 4b shows how the upward projecting protuberances 201 converge the light beam 102, whereas the downward projecting protuberances 202 diverge the light beam 102, which results in a mixed light pattern 103.

Figure 5:
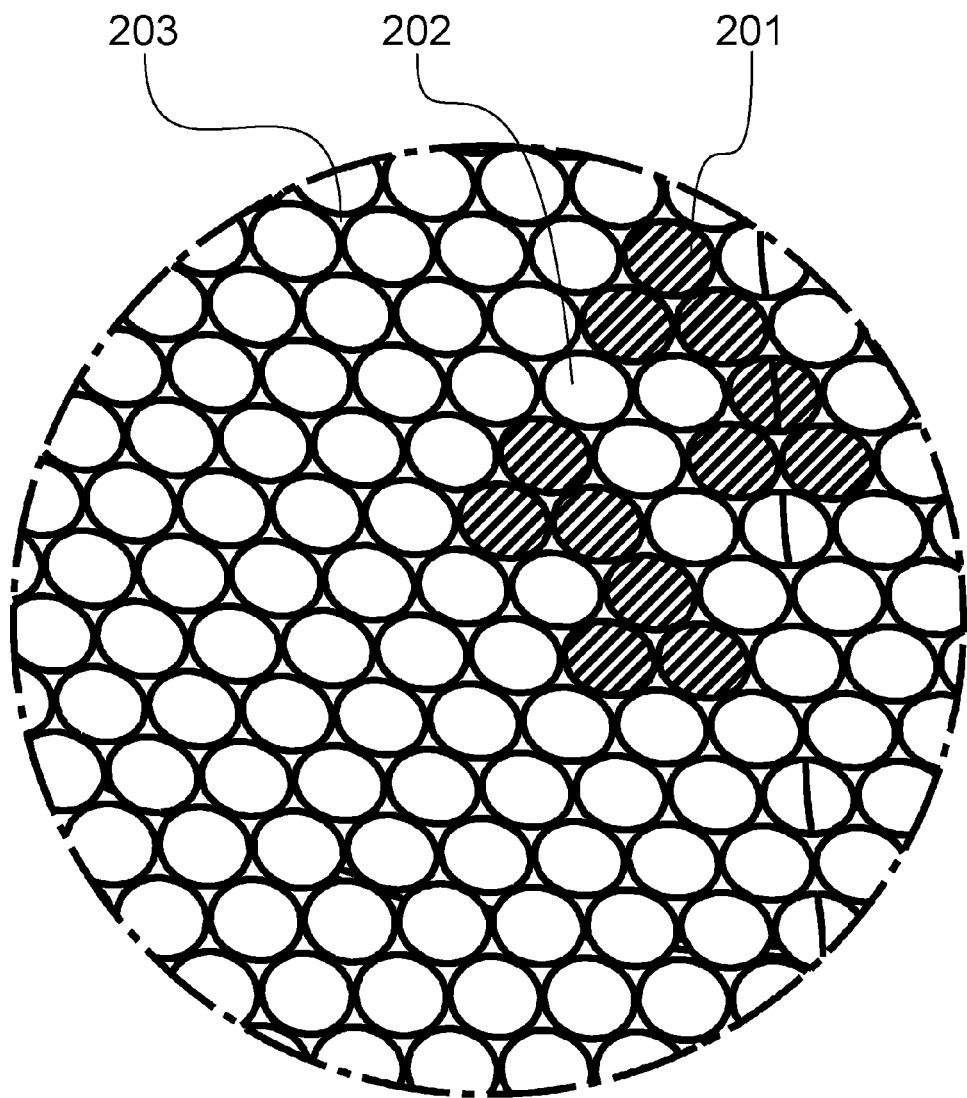

In the example shown in FIGS. 2 to 4, the protuberances 201, 202 projecting to opposite directions from the base surface 203, are arranged somewhat sporadically in an alternating fashion. It is, however, possible to group up sub-pluralities of protuberances extending in one direction to create a structure demonstrated by FIG. 5. In the illustrated example protuberances 201, 202 extending in opposing directions are arranged in groups of three. In such an arrangement each protuberance is directly surrounded by two similar protuberances and four opposing protuberances. By grouping similar protuberances has the additional benefit of avoiding repetitive patterns in the resulting protuberance arrangement. The optical surface 200 preferably includes a similar amount of converging and diverging protrusions 201, 202 for avoiding aberration in the resulting light pattern.

Figure 6:
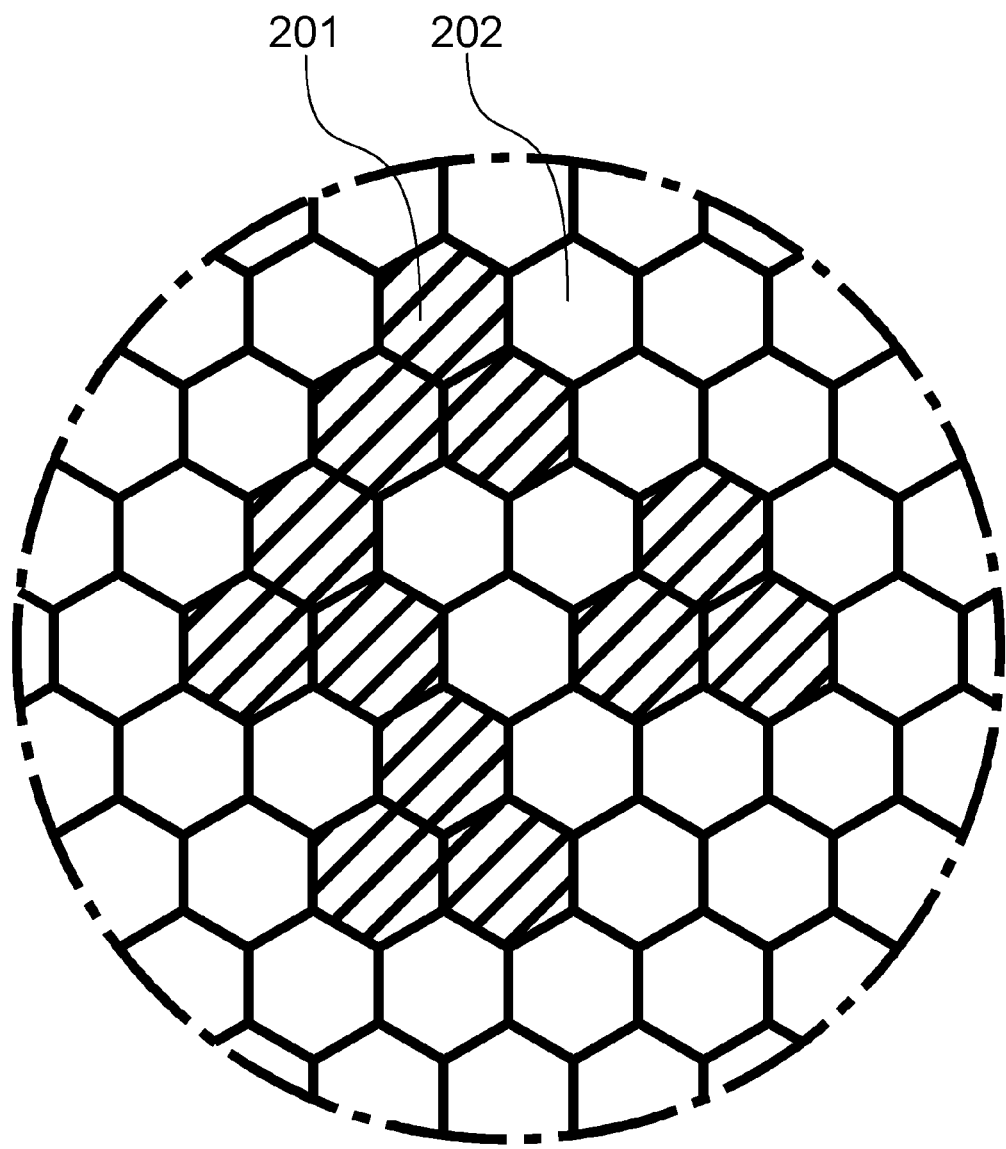
FIG. 6 presents a top elevation view of an optical surface according to a third embodiment of the invention featuring converging and diverging protuberances arranged as alternating groups of three without a planar section in between said protuberances.

Another embodiment of arranging the protuberances to the base surface 203 is shown in FIG. 6. Firstly it may be noted that the protuberances of said embodiment are grouped similarly as presented with reference to FIG. 5. Secondly it may be noted that in the example of FIG. 6 neighboring protuberances are not separated by a section of the base surface. Such a pattern may be accomplished by providing the protuberances 201, 202 with polygonal shape. Because similar protuberances are grouped in groups of three, a pattern without separating base surface sections is enabled by a hexagonal shape when examined from an elevated plan view.

Figure 7:
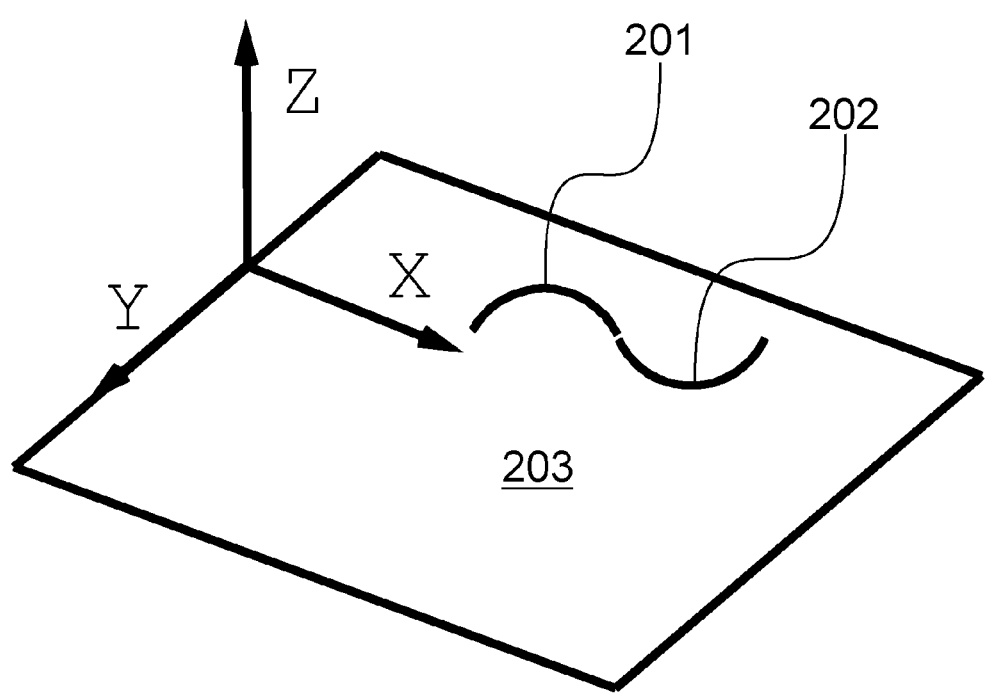
FIG. 7 presents a schematic isometric view of the embodiment of FIG. 6 in a mathematical plane.
Figure 8:
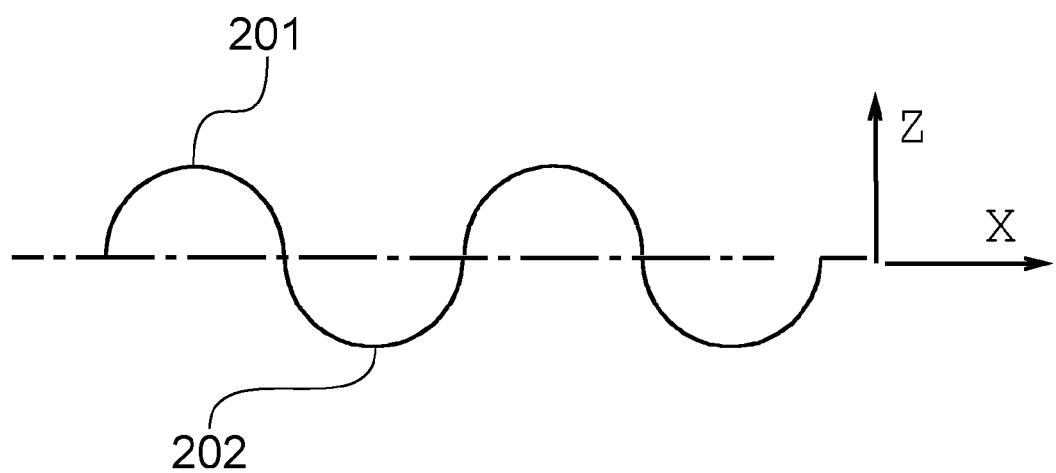
FIG. 8 presents a schematic cross-sectional view of the embodiment of FIG. 6 in a mathematical plane.

A modified embodiment featuring interconnected protuberances 201, 202 is demonstrated by FIGS. 7 and 8. Said Figures depict a pattern of circular protuberances 201, 202 which are interconnected such that the curvature of a previous protuberance is continued by a following protuberance extending in the opposite direction. The benefit of merged protuberances is that all light beams emitted from the optical surface are refracted thus achieving maximum mixing of wavelengths.

The protuberances 201, 202 capable of achieving the desired effect through converging and diverging refractions or reflections may be provided with various different specifications. The desired effect may be achieved with a variety of different size of lenses and corresponding protuberances. For example, an optical surface having the diameter of 20 mm may be provided with protuberances having a diameter of 0.01 to 1.5 mm. However, if the diameter of the optical surface is enlarged to 100 mm, the diameter of the protuberances could be of the order of 0.01 to 2 mm. In this respect, the mutual size difference of the optical surface and the protuberance may vary greatly. Generally speaking, it is preferably to provide the protuberances as dense as possible of improving the mixing effect. The distance between two neighboring protuberance is therefore preferably less than twice the diameter of the protuberance. The depth of the protuberances is dictated by the reflective properties of the optical surface. Accordingly, the depth of the protuberances ranges from almost planar to a depth which corresponds to the critical angle for total internal reflection. If this depth were to be exceeded, the light beam would reflect to an undesirable direction thus failing to achieve the desired mixing effect.

The optical surface 200 as described above is preferably manufactured in a molding process. The protuberances are therefore established by laser machining the mold surface.

The optical surface 200 may be applied to any structure which transits a light beam. Particular applications for such an optical surfaces are the emission surfaces of lenses and the reflective surfaces of reflectors. It is also to be noted that a combination of optical surfaces in a device may be provided with the protuberances herein described. For example, in a system including two lenses arranged successively, both emission surfaces may be provided with such protuberances, whereas only one TIR surface, i.e. lateral or flanking surface, may be provided with protuberances. The TIR surface—i.e. total internal reflection surface—connects the incidence surface of the lens to the emission surface thereof in an outwardly flaring manner. The idea behind the TIR surface is that the artificial light beam arriving scattered from the reflector and reflecting through the incidence surface is reflected efficiently by the TIR surface for minimizing radiation energy losses.

It is therefore advantageous to use a TIR surface on the flank of the lens. Alternatively, the TIR surface may be parabolic.

Indeed, any of the optical surfaces may be provided with such protuberances; it may be the light incidence surface, TIR surface or the emission surface. Also it is to be noted that the shape of the protuberance need not conform to a mathematical shape but the cross-sectional shape of the protuberance may also be a so called free-form line being sculptured freely.

The optical surface may also or alternatively be a reflecting surface in a reflector.

The novel optical surface may be used to mix wavelengths originating from a single artificial light source, such as an LED, or from a plurality of artificial light source, such as a compound LED having individual LED's for each primary color or a cluster of LED's, for example.

Alternatively or additionally, only a portion of the optical surface may be provided with such color mixing protuberances.

TABLE 1

LIST OF REFERENCE NUMBERS.

| Number | Part |
|---|---|
| 101a | first emitted light beam |

TABLE 1-continued

LIST OF REFERENCE NUMBERS.

| Number | Part |
|---|---|
| 101b | second emitted light beam |
| 102a | first reflected light beam |
| 102b | second reflected light beam |
| 103 | scattered light beam with mixed wavelengths |
| 200 | emission surface |
| 201 | first plurality of protuberances, converging protuberances |
| 202 | second plurality of protuberances, diverging protuberances |
| 203 | base surface |

The invention claimed is:

1. An optical surface extending in at least two Cartesian base dimensions (X, Y), wherein a cross-section of the optical surface taken in either of said two Cartesian base dimensions (X, Y) comprises a first plurality of protuberances extending to the same direction in a third Cartesian dimension (Z), wherein
   said cross-section of the optical surface comprises a second plurality of protuberances extending to the opposite direction as the first plurality of protuberances in the third Cartesian dimension (Z),
   the pluralities of protuberances form converging and diverging optical shapes for mixing different wavelengths scattering from the optical surface, and
   each protuberance is separated by a section along a base surface defined by said two Cartesian base dimensions (X, Y).

2. The optical surface according to claim 1, wherein the two Cartesian base dimensions (X, Y) define a base surface from which the first and second plurality of protuberances are deviations which exhibit an area acting as a converging or diverging optical surface.

3. The optical surface according to claim 1, wherein the surfaces formed by the protuberances are defined in all Cartesian dimensions (X, Y, Z).

4. The optical surface according to claim 1, wherein the first and second plurality of protuberances extend over a substantially same length from the base surface defined by said two Cartesian base dimensions (X, Y).

5. The optical surface according to claim 1, wherein the optical surface exhibits effectively the same amount of protuberances in both directions in the third Cartesian dimension (Z).

6. The optical surface according to claim 1, wherein the first plurality of protuberances as well as the second plurality of protuberances are arranged as groups each featuring three neighboring either first or second protuberance, respectively.

7. The optical surface according to claim 1, wherein the protuberances have a circular, elliptical or polygonal shape when viewed in the third Cartesian dimension (Z).

8. The optical surface according to claim 1, wherein the protuberances have a hexagonal shape when viewed in the third Cartesian dimension (Z).

9. The optical surface according to claim 1, wherein the optical surface has a thickness in the third Cartesian dimension (Z).

* * * * *